United States Patent Office.

JOSEPH BAYSORE, OF FREEPORT, ILLINOIS.

Letters Patent No. 75,513, dated March 17, 1868.

---

IMPROVED CAR-TRUCK.

---

The Schedule referred to in these Letters Patent and making part of the same.

---

TO ALL WHOM IT MAY CONCERN:

Be it known that I, JOSEPH BAYSORE, of Freeport, in the county of Stephenson, and State of Illinois, have invented a new and improved Car-Truck; and I do hereby declare that the following is a full, clear, and exact description thereof, which will enable those skilled in the art to make and use the same, reference being had to the accompanying drawings, forming part of this specification.

The object of this invention is to construct a truck, and adapt or apply it to a car in such a manner that in the event of the breaking of a wheel or axle the truck will be sustained in position, and the car prevented from being thrown off the track—a contingency which almost invariably occurs when the axle or wheel of a truck breaks or gives way. In the accompanying sheet of drawings—

Figure 2:
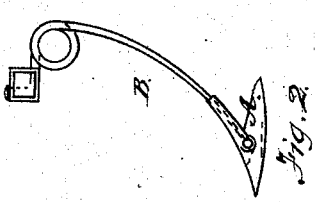
Figure 1:
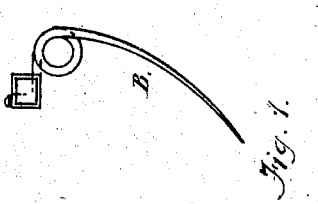

Figure 1 is a side sectional view of my invention, taken in the line $x\ x$, fig. 2.

Figure 2, a plan or top view of the same detached from the floor of the car.

Figure 5:
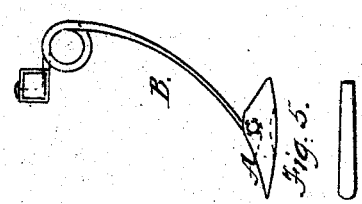
Figure 4:
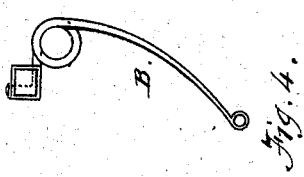
Figure 3:
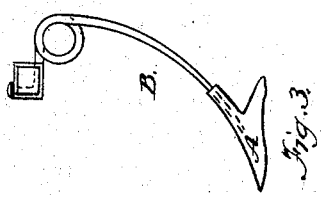

Figure 3, a transverse section of a portion of the same, taken in the line $y\ y$, fig. 1.

Similar letters of reference indicate corresponding parts.

The frame of the truck is composed of two longitudinal side-pieces, $a\ a$, connected by transverse bars $b\ b$, $c\ c$, as will be understood by referring to figs. 1 and 2. A A represent the axles of the truck, and B the wheels, the latter being secured on the former in the usual or any proper manner, and having their journals fitted in the ordinary or any suitable boxes. C represents springs, which are attached to the under side of the transverse bars $b\ b$, and extend outward, and are bent in loop-form to encompass the axles A A, as shown in fig. 1. Between these springs C and bars D, above the axles, there are interposed springs E, and to said bars D there are attached metal straps F, two to each bar, through which straps the axles pass. Between the bars $b\ b$ there is fitted a sliding bar, G, the bottom of G resting on springs H attached to a bar, I, the ends of which are fitted in metal straps $d$, the upper ends of the straps being attached to the upper surfaces of the bars $b\ b$, as shown in fig. 1. To the upper surface of the sliding bar G there are attached rollers $e$, upon which a circle-plate, J, secured to the under side of the car-bed K rests, and upon the upper surface of said circle-plate, rollers L work, which are attached to the upper surfaces of the bars D. These rollers L serve as a support for the bars D in the event of the breaking of a wheel or axle, and prevent the truck from falling and throwing the car off from the track. The truck is connected to the car-bed K by a bolt, $f$, which is concentric with the circle-plate J. The straps F serve as temporary boxes to hold the axles in the event of the breaking of the same, or a wheel thereon. The springs C E admit of a requisite play of the bars to conform to the vertical play of the car-body under the action of the springs H, on which the axle-boxes rest.

I claim as new, and desire to secure by Letters Patent—

The arrangement and method of connection of the axles A of the truck to the car-bed K, through the medium of the straps F, bars D, rollers L, and circle-plate J, arranged substantially in the manner as and for the purpose set forth.

I also claim the springs C E, arranged and applied to the truck substantially in the manner as and for the purpose specified.

JOSEPH BAYSORE.

Witnesses:
FRANKLIN UNANGST,
CRISTIAN X NEISCHWENDER.
    his mark.

H. L. Beach.
Horse-Rake.

Nº 75514      Patented Mar. 17, 1868

Geo. E. Lemman.
H. O. Degener

H. L. Beach by his atty
A. Sidney Doane